United States Patent Office 3,371,039
Patented Feb. 27, 1968

3,371,039
STABILIZATION OF ORGANIC SUBSTANCES BY ADDITION REACTION PRODUCT OF PHOSPHORUS ACID ESTER WITH POLYMER OF POLYCARBOXYLIC ACID AND ALKANOLAMINE
Henryk A. Cyba, Evanston, Ill., assignor to Universal Oil Products Company, Des Plaines, Ill., a corporation of Delaware
No Drawing. Original application Dec. 12, 1963, Ser. No. 330,007. Divided and this application Apr. 7, 1967, Ser. No. 629,093
21 Claims. (Cl. 252—32.7)

ABSTRACT OF THE DISCLOSURE

Organic substance subject to deterioration during transportation, storage and use stabilized against said deterioration by the addition reaction product of certain phosphorus compounds with the reaction product of polyhalopolyhydropolycyclicdicarboxylic acid, anhydride, diol or ester with alkanolamine containing at least two hydroxyl or amino groups.

CROSS-REFERENCE TO RELATED APPLICATION

This application is a division of application Ser. No. 330,007, filed Dec. 12, 1963, now Patent 3,331,892, dated July 18, 1967.

DESCRIPTION OF THE INVENTION

This application relates to the use of a novel composition of matter comprising the addition reaction product of an alkylphosphate, alkylthiophosphate, alkylphosphinate or alkylphosphonate with a polymeric reaction product of a particular type of dicarboxylic acid or derivative thereof and a particular type of alkanolamine.

As will be set forth in detail hereinafter, the addition reaction products of the present invention are especially useful as additives to organic substances and particularly lubricating compositions comprising a major proportion of an oil of lubricating viscosity. With the increased technology in the art of lubrication, there is an ever increasing need for lubricants which will withstand the increasing severity requirements of such oils. While improved lubricants have been developed, it still is necessary to further improve these lubricants and this is accomplished by incorporating one or more additives into the lubricant. The novel addition reaction product of the present invention serves to improve the lubricants in a number of ways including one or more of extreme pressure (E.P.) additive, oiliness additive, oxidation inhibitor, rust and/or corrosion inhibitor, antiwear agent, viscosity index improver, pour point depressant, etc., and, in addition, serves as a detegent and dispersant. The combination of phosphate or thiophosphate, acid residue and alkanolamine residue is provided as a unitary product in which the various components, apparently due to close chemical and physical association, co-act to produce an additive of improved properties.

In one embodiment the present invention relates to the use of the addition reaction product of a phosphate selected from the group consisting of alkylphosphate, alkylthiophosphate, alkylphosphinate, alkylphosphonate or their thio-derivatives with polymeric reaction product of a compound selected from the group consisting of polyhalopolyhydropolycyclicdicarboxylic acid, corresponding anhydride, corresponding diol and ester of said acid with an alkanolamine selected from the group consisting of alkanolamine containing at least two hydroxyl and one amino groups and alkanolamine containing at least one hydroxyl and two amino groups.

In a specific embodiment the present invention relates to the use of the addition reaction product as an additive in organic substances including hydrocarbon oils, particularly lubricants, and plastics especially those requiring flame-proofing properties.

Any suitable alkylphosphate is used in preparing the addition reaction product and includes both the alkyl acid orthophosphates and the alkyl acid pyrophosphates. In the alkyl acid orthophosphates, the monoalkyl ester, dialkyl ester or a mixture thereof may be employed. In the alkyl acid pyrophosphates, the monoalkyl ester, dialkyl ester, trialkyl ester or mixtures thereof may be employed, the dialkyl esters being preferred and the ester groups may be attached to the same or different phosphorus atom. Generally, however, this compound will be symmetrical and, accordingly, the alkyl ester groups will be attached to different phosphorus atoms.

In a preferred embodiment the alkyl phosphate contains at least one alkyl group of at least six carbon atoms and more particularly from about six to about twenty or more carbon atoms. Illustrative preferred alkyl acid orthophosphates include monohexyl acid orthophosphate, dihexyl acid orthophosphate, mixture of mono- and dihexyl acid orthophosphates, monoheptyl acid orthophosphate, diheptyl acid orthophosphate, mixture of mono- and diheptyl acid orthophosphates, monooctyl acid orthophosphate, dioctyl acid orthophosphate, mixture of mono- and dioctyl acid orthophosphates, monononyl acid orthophosphate, dinonyl acid orthophosphate, mixture of mono- and dinonyl acid orthophosphates, monodecyl acid orthophosphate, didecyl acid orthophosphate, mixture of mono- and didecyl acid orthophosphates, monoundecyl acid orthophosphate, diundecyl acid orthophosphate, mixture of mono- and diundecyl acid orthophosphates, monododecyl acid orthophosphate, didodecyl acid orthophosphate, mixture of mono- and didodecyl acid orthophosphates, monotridecyl acid orthophosphate, ditridecyl acid orthophosphate, mixture of mono- and ditridecyl acid orthophosphates, monotetradecyl acid orthophosphate, ditetradecyl acid orthophosphate, mixture of mono- and ditetradecyl acid orthophosphates, monopentadecyl acid orthophosphate, dipentadecyl acid orthophosphate, mixture of mono- and dipentadecyl acid orthophosphates, monohexadecyl acid orthophosphate, dihexadecyl acid orthophosphate, mixture of mono- and dihexadecyl acid orthophosphates, monoheptadecyl acid orthophosphate, diheptadecyl acid orthophosphate, mixture of mono- and diheptadecyl acid orthophosphates, monooctadecyl acid orthophosphate, dioctadecyl acid orthophosphate, mixture of mono- and dioctadecyl acid orthophosphates, mononadecyl acid orthophosphate, dinonadecyl acid orthophosphate, mixture of mono- and dinonadecyl acid orthophosphates, monoeicosyl acid orthophosphate, dieicosyl acid orthophosphate, mixture of mono- and dieicosyl acid orthophosphates, etc. In another embodiment the alkyl group or groups are selected from methyl, ethyl, propyl, butyl and pentyl. It is understood that a mixture of the phosphates having alkyl groups of different chain lengths may be employed. Although alkyl groups are preferred, aryl or alkaryl groups may be used successfully where such use is warranted or preferred.

Preferred alkyl acid pyrophosphates include monohexyl acid pyrophosphate, dihexyl acid pyrophosphate, mixture of mono- and dihexyl acid pyrophosphates, monoheptyl acid pyrophosphate, diheptyl acid pyrophosphate, mixture of mono- and diheptyl acid pyrophosphates, monooctyl acid pyrophosphate, dioctyl acid pyrophosphate, mixture of mono- and dioctyl acid pyrophosphates, mononyl acid pyrophosphate, dinonyl acid pyrophosphate, mixture of mono- and dinonyl acid pyrophosphates, monodecyl acid pyrophosphate, didecyl acid pyrophosphate, mixture of mono- and didecyl acid pyrophosphates, monoundecyl acid pyrophosphate, diundecyl acid pyrophosphate, mixture of mono- and diundecyl acid pyrophosphates, monododecyl acid pyrophosphate, didodecyl acid pyrophosphate, mixture of mono- and didodecyl acid pyrophosphates, monotridecyl acid pyrophosphate, ditridecyl acid pyrophosphate, mixture of mono- and ditridecyl acid pyrophosphates, monotetradecyl acid pyrophosphate, ditetradecyl acid pyrophosphate, mixture of mono- and ditetradecyl acid pyrophosphates, monopentadecyl acid pyrophosphate, dipentadecyl acid pyrophosphate, mixture of mono- and dipentadecyl acid pyrophoshates, monohexadecyl acid pyrophosphate, dihexadecyl acid pyrophosphate, mixture of mono- and dihexadecyl acid pyrophosphates, monoheptadecyl acid pyrophosphate, dihetadecyl acid pyrophosphate, mixture of mono- and diheptadecyl acid pyrophosphates, monooctadecyl acid pyrophosphate, dioctadecyl acid pyrophosphate, mixture of mono- and dioctadecyl acid pyrophosphates, monononadecyl acid pyrophosphate, dinonadecyl acid pyrophosphate, mixture of mono- and dinonadecyl acid pyrophosphates, monoeicosyl acid pyrophosphate, dieicosyl acid pyrophosphate, mixture of mono- and dieicosyl acid pyrophosphates, etc. In another embodiment the alkyl group or groups are selected from methyl, ethyl, propyl, butyl and pentyl. It is understood that a mixture of the phosphates having alkyl groups of different chain lengths may be employed. Also, aryl and alkaryl groups may be used in some cases.

Another phosphate for use in preparing the addition reaction product is prepared by the oxyalkylenation of an alcohol, which may be of aliphatic or aromatic configuration, and then forming the phosphate thereof. Aliphatic alcohols for oxyalkylenation may be saturated or unsaturated and preferably contain at least four carbon atoms and more particularly from about six to twenty or more carbon atoms. Illustrative alcohols include butyl alcohol, pentyl alcohol, hexyl alcohol, heptyl alcohol, octyl alcohol, nonyl alcohol, decyl alcohol, undecyl alcohol, dodecyl alcohol, tridecyl alcohol, tetradecyl alcohol, pentadecyl alcohol, hexadecyl alcohol, heptadecyl alcohol, octadecyl alcohol, nondecyl alcohol, eicosyl alcohol ,etc. These alcohols conveniently are derived from fatty acids and accordingly include, for example, lauryl alcohol, myristyl alcohol, palmityl alcohol, stearyl alcohol, decylenyl alcohol, dodecylenyl alcohol, palmitolyl alcohol, oleyl alcohol, linoleyl alcohol, linolenyl alcohol, gadoleyl alcohol, etc.

Aromatic alcohols include phenol and particularly alkylphenols. The alkylphenols preferably contain at least four and more particularly from about six to about twenty carbon atoms in the alkyl group. Illustrative alkylphenols include hexyphenol, heptylphenol, octylphenol, nonylphenol, decylphenol, undecylphenol, dodecylphenol, tridecylphenol, tetradecylphenol, pentadecylphenol, hexadecylphenol, heptadecylphenol, octadecylphenol, nonadecylphenol, eicosylphenol, etc., as well as dialkyl and trialkylphenols in which the alkyl groups are selected from those hereinbefore specifically set forth. Also, the polyalkylphenols may contain one or more alkyl groups containing from one to six carbon atoms and one or more alkyl groups containing from six to twenty carbon atoms.

Oxyalkylenation of the aliphatic or aromatic alcohol is effected in any suitable manner. While ethylene oxide is preferred for reaction with the aliphatic or aromatic alcohol, it is understood that propylene oxide, butylene oxide, pentylene oxide, hexylene oxide, etc., may be used. The oxyalkylenation is effected by reacting the aliphatic or aromatic alcohol with the alkylene oxide, particularly ethylene oxide, in the molar ratios to produce the oxyalkylenated alcohol or phenol containing the oxyalkylenated group in the desired proportion. In a preferred embodiment, the oxyalkylenated alcohol or phenol contains from two to about twelve or more and particularly from two to about six oxyalkylene groups. The oxyalkylenation is effected in any suitable manner and generally will be conducted at a temperature of from ambient to about 350° F. and more particularly from about 200° to about 300° F., preferably in the presence of a catalyst such as sodium hydroxide, potassium hydroxide, tetiary amine, quaternary hydroxide, etc. When the oxyalkylenation is to be limited to the addition of one oxy group, the catalyst is used with the alkanols but may be omitted with the alkylphenols. Superatmospheric pressure may be employed and may be within the range of from about 10 to 1000 pounds or more.

The oxyalkylenated aliphatic or aromatic alcohol then is reacted in any suitable manner with $P_2O_5$ to form the desired phosphate. One molar proportion of $P_2O_5$ or other suitable phosphorus oxide is reacted per one or two molar proportions of the oxyalkylenated hydrocarbon. In general, an excess of $P_2O_5$ is employed in order to insure complete reaction. The reaction is effected at a temperature within the range of from ambient to about 250° F. and under substantially anhydrous conditions. The resultant free acid form of the phosphate generally is recovered as a viscous liquid.

Another embodiment of the invention comprises the alkylthiophosphate salt. Illustrative preferred dialkyldithiophosphates include monohexyl-dithiophosphate, dihexyl-dithiophosphate, mixture of mono- and dihexyl-dithiophosphate, monoheptyl-dithiophosphate, diheptyl-dithiophosphate, mixture of mono- and diheptyl-dithiophosphate, monooctyl - dithiophosphate, dioctyl-dithiophosphate, mixture of mono- and dioctyl-dithiophosphate, mononoryl-dithiophosphate, dinonyl-dithiophosphate, mixture of mono- and dinonyl-dithiophosphate, monodecyl-dithiophosphate, didecyl-dithiophosphate, mixture of mono- and didecyl-dithiophosphate, monoundecyl-dithiophosphate, diundecyl-dithiophosphate, mixture of mono- and diundecyl-dithiophosphate, monododecyl-dithiophosphate, didodecyl-dithiophosphate, mixture of mono- and didodecyl-dithiophosphate, monotridecyl-dithiophosphate, ditridecyl - dithiophosphate, mixture of mono- and ditridecyl-dithiophosphate, monotetradecyl-dithiophosphate, ditetradecyl-dithiophosphate, mixture of mono- and ditetradecyl-dithiophosphate, monopentadecyl-dithiophosphate, dipentadecyl-dithiophosphate, mixture of mono- and dipentadecyl-dithiophosphate, monohexadecyl-dithiophosphate, dihexadecyl - dithiophosphate, mixture of mono- and dihexadecyl-dithiophosphate, monoheptadecyl - dithiophosphate, diheptadecyl - dithiophosphate, mixture of mono- and diheptadecyl-dithiophosphate, monooctadecyl - dithiophosphate, dioctadecyl - dithiophosphate, mixture of mono- and dioctadecyl-dithiophosphate, monononadecyl - dithiophosphate, dinonadecyl - dithiophosphate, mixture of mono- and dinonadecyl-dithiophosphate, monoeicosyl-dithiophosphate, dieicosyl-dithiophosphate, mixture of mono- and dieicosyl-dithiophosphate, etc.

The oxyalkylenated aliphatic or aromatic alcohol dithiophosphates are prepared in substantially the same manner as hereinbefore set forth for the oxyalkylenated aliphatic or aromatic alcohol phosphates, except that $P_2S_5$ or other suitable phosphorous sulfide is used instead of the phosphorus oxide. Illustrative preferred oxyalkylenated alkylphenol dithiophosphates include di-(oxyethylenated hexylphenol) - dithiophosphate containing from one to fifteen oxyethylene groups, di-(oxyethylenated dihexylphenol)-dithiophosphate containing from one to fifteen oxyethylene groups, di-(oxyethylenated heptylphenol) - dithiophosphate containing from one to fifteen oxyethylene groups, di-(oxyethylenated diheptylphenol)-dithiophosphate containing from one to fifteen oxyethylene groups, di-(oxyethylenated octylphenol) - dithiophosphate containing from one to fifteen oxyethylene groups, di - (oxyethylenated dioctylphenol) - dithiophosphate containing from one to fifteen oxyethylene groups, di - (oxyethylenated nonylphenol) - dithiophosphate containing from one to fifteen oxyethylene groups, di-(oxyethylenated dinonylphenol) - dithiophosphate containing from one to fifteen oxyethylene groups, di - (oxyethylenated decylphenol) - dithiophosphate containing from one to fifteen oxyethylene groups, di-(oxyethylenated didecylphenol)-dithiophosphate containing from one to fifteen oxyethylene groups, di - (oxyethylenated undecylphenol) - dithiophosphate containing from one to fifteen oxyethylene groups, di - (oxyethylenated diundecylphenol)-dithiophosphate containing from one to fifteen oxyethylene groups, di - (oxyethylenated dodecylphenol) - dithiophosphate containing from one to fifteen oxyethylene groups, di - (oxyethylenated didodecylphenol)-dithiophosphate containing from one to fifteen oxyethylene groups, etc. It is understood that the corresponding mono-oxyalkylated alkylphenol dithiophosphate or the corresponding oxyalkylenated alkylphenol monothiophosphate may be used. It also is understood that the corresponding oxyalkylenated compounds in which the oxyalkylene group contains from three to eight or more carbon atoms may be used. As used in the present specification and claims, it is understood that the number of oxyalkylene groups means the number thereof per each alkylphenyl group or each alkyl group derived from the aliphatic alcohol.

Although alkyl or dialkyl phosphoric, phosphonic or phosphinic acids and their thio analogs are preferred, in some cases aryl or alkaryl or polyalkaryl phosphoric, phosphonic or phosphinic acids can be used. It is understood that the alkyl or aryl groups may be substituted by halogen, especially chlorine. Such a substitution is preferred for flame-proofing of plastics and resins or extreme pressure formulating of oils.

As hereinbefore set forth, the phosphate or thiophosphate is reacted with a polymeric reaction product of certain acids or derivatives thereof with certain alkanolamines. The acid or anhydride for use in the present invention is a polyhalopolyhydropolycyclicdicarboxylic acid or anhydride thereof. Any suitable acid or anhydride meeting these requirements is used in accordance with the present invention. In one embodiment the acid or anhydride is of the type known in the art as "Chlorendic" or "HET" acid or anhydride. This acid is prepared by the Diels-Alder addition reaction of maleic acid and hexachlorocyclopentadiene. The corresponding anhydride is prepared by the reaction of maleic anhydride and hexachlorocyclopentadiene. This acid or anhydride also may be named 1,4,5,6,7,7 - hexachlorodicyclo - (2.2.1)-5-heptene-2,3-dicarboxylic acid or the corresponding anhydride. These compounds are prepared by the reaction of equal molar quantities of the reactants, generally by refluxing in the presence of a solvent. These reactions are well known in the art and are described, for example, in U.S. Patent 2,606,910 and elsewhere.

In place of maleic acid or maleic anhydride, it is understood that other suitable dicarboxylic acids containing carbon to carbon unsaturation may be employed. Illustrative examples include fumaric acid, itaconic acid, citraconic acid, glutaconic acid, etc. Also, in place of hexachlorocyclopentadiene, other suitable halo-substituted cycloalkadienes may be used. Illustrative examples include 1,2-dichlorocyclopentadiene, 1,5 - dichlorocyclopentadiene, 1,2,3 - trichlorocyclopentadiene, 1,2,3,4-tetrachlorocyclopentadiene, 1,2,3,4,5 - pentachlorocyclopentadiene and similar compounds in which all or part of the chlorine is replaced by other halogen and particularly bromine.

A particularly preferred polyhalopolyhydropolycyclicdicarboxylic acid or anhydride is prepared by the Diels-Alder condensation of a conjugated aliphatic diene with an olefinic dicarboxylic acid and then further condensing the resultant cyclohexenedicarboxylic acid with a halocycloalkadiene. A specifically preferred reaction product is the Diels-Alder condensation of 1,3-butadiene with maleic acid to form 1,2,3,6-tetrahydrophthalic acid, followed by the Diels-Alder condensation with hexachlorocyclopentadiene. The product may be named 5,6,7,8,9,9-hexachloro-1,2,3,4,4a,5,8,8a-octahydro-5,8 - methano-2,3-naphthalenedicarboxylic acid, hereinafter referred to as "A" acid. The corresponding anhydride is prepared starting with maleic anhydride instead of maleic acid. The anhydride may be named 5,6,7,8,9,9-hexachloro-1,2,3,4,4a,5,8,8a-octahydro-5,8-methano-2,3 - naphthalenedicarboxylic anhydride, hereinafter referred to as "A" anhydride. Here again, other conjugated aliphatic dienes may be used including, for example, 2-methyl-1,3-butadiene, 1,3-pentadiene, 1,3-hexadiene, 2,4-hexadiene, 2,3-dimethyl-1,3-butadiene, 1,3-heptadiene, 2,4-heptadiene, conjugated nonadienes, etc., halodienes as, for example, chloroprene, and particularly 1-chlorobutadiene and 1,4-dichlorobutadiene. Similarly, other unsaturated dicarboxylic acids may be used including fumaric acid, itaconic acid, citraconic acid, glutaconic acid, messaconic acid, etc. Also, other halocycloalkadienes may be used including, for example, those specifically hereinbefore set forth. The preparation of these compounds also is known in the art and is set forth in detail in U.S. Patent 3,017,431.

Still another preferred polyhalopolyhydropolycyclicdicarboxylic acid or anhydride is prepared by condensing cyclopentadiene with maleic acid or maleic anhydride to form norborn-5-ene-2,3-dicarboxylic acid or anhydride and then condensing the same with hexachlorocyclopentadiene. The product may be named 5,6,7,8,9,9-hexachloro-1,2,3,4,4a,5,8,8a-octahydro-1,4,5,8-dimethano - 2,3 - naphthalenedicarboxylic acid or anhydride, hereinafter referred to as "B" acid and "B" anhydride respectively. Here again, it is understood that other conjugated cycloaliphatic dienes, other unsaturated dicarboxylic acids or anhydrides and other polyhalocycloalkadienes may be used to prepare suitable polyhalopolyhydropolycyclicdicarboxylic acids or anhydrides.

From the above, it will be seen that any suitable polyhalopolyhydropolycyclicdicarboxylic acid or anhydride may be used in accordance with the present invention. The polyhalopolyhydropolycyclicdicarboxylic acid may be illustrated by the following general structure:

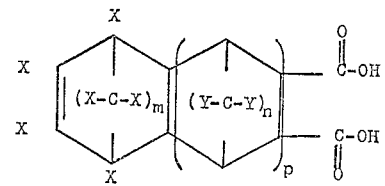

in which X is selected from the group consisting of halogen and particularly chlorine and/or bromine, hydrogen and an alkyl radical of from one to ten and preferably from one to four carbon atoms, at least two of the X's being halogen, Y is selected from the group consisting of halogen, hydrogen and an alkyl radical of one to ten and preferably from one to four carbon atoms, $m$ is an integer of from one to four, $n$ ranges from zero to four and $p$ ranges from zero to four.

The above structure illustrates the dicarboxylic acid. In the interest of simplicity, the corresponding anhydride is not being illustrated, but is readily ascertainable from the above structure.

Referring to the above structure, when X is chlorine, $m$ is one, $n$ is zero and $p$ is zero, the compound is 1,4,5,6,7,7-hexachloro-(2.2.1)-5-heptene-2,3-dicarboxylic acid or the corresponding anhydride. Similarly, when X is chlorine, $m$ is one, $n$ is zero and $p$ is one, the compound is 5,6,7,8,9,9-hexachloro-1,2,3,4,4a,5,8,8a - octahydro - 5,8-anhydride. Also, when X is chlorine Y is hydrogen $m$ is one, $n$ is one and $p$ is one, the compound is 5,6,7,8,9,9-hexachloro-1,2,3,4,4a,5,8,8a-octahydro - 14,5,8 - dimethano-2,3-naphthalenedicarboxylic acid or the corresponding anhydride.

While the particular acid or anhydride set forth above is preferred, it is understood that an ester of the acid may be used for reacting with the alkanolamine. Any suitable ester may be used and is prepared by reacting the acid with an alcohol under conditions to liberate water. While the alcohol may contain from one to eighteen carbon atoms, it preferably contains one to four carbon atoms. Illustrative alcohols include methanol, ethanol, propanol, butanol, pentanol, hexanol, etc.

In still another embodiment the corresponding mono or diol of the dicarboxylic acids set forth above may be used. The diol is readily prepared by reacting hexachlorocyclopentadiene with 1,4-butenediol in a manner similar to that described previously to form the diol corresponding to "Chlorendic" acid. In another example the diol is prepared by reacting hexachlorocyclopentadiene with alpha-allyl glycerol ether. These reactions are well known in the art and are described, for example, in U.S. Patent 3,007,958. Similarly, hexachlorocyclopentadiene is reacted with 2,3-dimethanocyclohex-5-ene to form the diol corresponding to the A acid. It is understood that any suitable mono or diol of the dicarboxylic acid set forth above may be used for reacting with the alkanolamine. In another embodiment the diol is reacted with a dicarboxylic acid or anhydride, either prior to or simultaneously with the reaction with the alkanolamine. Illustrative dicarboxylic acids include malonic acid, succinic acid, glutaric acid, adipic acid, pimelic acid suberic acid azelaic acid, sebacic acid, etc., and the corresponding anhydrides. The reaction is readily effected by refluxing the mixture, preferably in the presence of a solvent including aromatic hydrocarbons as benzene, toluene, xylene, cumene, etc., or other solvents such as Decalin.

As hereinbefore set forth, the dicarboxylic acid, anhydride, ester and/or diol is reacted with a particular alkanolamine. It is essential that the alkanolamine contains at least two hydroxyl and one amine groups or at least one hydroxyl and two amino groups. The embodiment of the alkanolamine containing two hydroxyl and one amino groups are dialkanolamines and preferably N-aliphatic-dialkanolamines in which the aliphatic group attached to the nitrogen atom contains from one to about fifty carbon atoms and preferably from about eight to about twenty-two carbon atoms. The alkanol groups preferably contain from about two to about four carbon atoms each, although it is understood that they may contain up to about twenty carbon atoms each. Preferably the N - aliphatic - dialkanolamine is N - alkyl - diethanolamine. Illustrative compounds include N-methyl-diethanolamine,
N-ethyl-diethanolamine,
N-propyl-diethanolamine,
N-butyl-diethanolamine,
N-pentyl-diethanolamine,
N-hexyl-diethanolamine,
N-heptyl-diethanolamine,
N-octyl-diethanolamine,
N-nonyl-diethanolamine,
N-decyl-diethanolamine,
N-undecyl-diethanolamine,
N-dodecyl-diethanolamine,
N-tridecyl-diethanolamine,
N-tetradecyl-diethanolamine,
N-pentadecyl-diethanolamine,
N-hexadecyl-diethanolamine,
N-heptadecyl-diethanolamine,
N-octadecyl-diethanolamine,
N-nonadecyl-diethanolamine,
N-eicosyl-diethanolamine,
N-heneicosyl-diethanolamine,
N-docosyl-diethanolamine,
N-tricosyl-diethanolamine,
N-tetracosyl-diethanolamine,
N-pentacosyl-diethanolamine,
N-hexacosyl-diethanolamine,
N-heptacosyl-diethanolamine,
N-octacosyl-diethanolamine,
N-nonacosyl-diethanolamine,
N-triacontyl-diethanolamine,
N-hentriacontyl-diethanolamine,
N-dotriacontyl-diethanolamine,
N-tritriacontyl-diethanolamine,
N-tetratriacontyl-diethanolamine,
N-pentatriacontyl-diethanolamine,
N-hexatriacontyl-diethanolamine,
N-heptatriacontyl-diethanolamine,
N-octatriacontyl-diethanolamine,
N-nonatriacontyl-diethanolamine,
N-tetracontyl-diethanolamine,
N-hentetracontyl-diethanolamine,
N-dotetracontyl-diethanolamine,
N-tritetracontyl-diethanolamine,
N-tetratetracontyl-diethanolamine,
N-pentatetracontyl-diethanolamine,
N-hexatetracontyl-diethanolamine,
N-heptatetracontyl-diethanolamine,
N-octatetracontyl-diethanolamine,
N-nonatetracontyl-diethanolamine,
N-pentacontyl-diethanolamine, etc.

In some cases, N-alkenyl-diethanolamines may be utilized. Illustrative N-alkenyl-diethanolamines include N-hexenyl-diethanolamine,
N-heptenyl-diethanolamine,
N-octenyl-diethanolamine,
N-noneyl-diethanolamine,
N-decenyl-diethanolamine,
N-undecenyl-diethanolamine,
N-dodecenyl-diethanolamine,
N-tridecenyl-diethanolamine,
N-tetradecenyl-diethanolamine,
N-pentadecenyl-diethanolamine,
N-hexadecenyl-diethanolamine,
N-heptadecenyl-diethanolamine,
N-octadecenyl-diethanolamine,
N-nonadecenyl-diethanolamine,
N-eicosenyl-diethanolamine, etc.

It is understood that the N-aliphatic-diethanolamines may contain an aliphatic substituent attached to one or both of the carbon atoms forming the ethanol groups. These compounds may be illustrated by N-aliphatic-di-(1-methylethanolamine),
N-aliphatic-di-(1-ethylethanolamine),
N-aliphatic-di-(1-propylethanolamine),
N-aliphatic-di-(1-butylethanolamine),
N-aliphatic-di-(1-pentylethanolamine),
N-aliphatic-di-(1-hexylethanolamine), etc.,
N-aliphatic-di-(2-methylethanolamine),
N-aliphatic-di-(2-ethylethanolamine),
N-aliphatic-di-(2-propylethanolamine),
N-aliphatic-di-(2-butylethanolamine),
N-aliphatic-di-(2-pentylethanolamine),
N-aliphatic-di-(2-hexylethanolamine), etc.

It is understood that these specific compounds are illustrative only and that other suitable compounds containing the diethanolamine configuration may be employed. The specific compounds hereinbefore set forth are examples of N-aliphatic-diethanolamines. Other N-aliphatic-dialkanolamines include N-aliphatic - dipropanolamines and N-aliphatic-dibutanolamines, although N-aliphatic-dipentanolamines, N - aliphatic - dihexanolamines and higher dialkanolamines may be used in some cases. It is understood that these dialkanolamines may be substituted in a manner similar to that specifically described hereinbefore in connection with the discussion of the diethanolamines. Furthermore, it is understood that mixtures of N-aliphatic-dialkanolamines may be employed, preferably being selected from those hereinbefore set forth, and that the substitution may comprise cycloalkyl and particularly cyclohexyl. Also, it is understood that the various dialkanolamines are not necessarily equivalent.

A number of N-alkyl-diethanolamines are available commercially and are advantageously used in preparing the condensation product. For example, N-tallow-diethanolamine is available under the trade name of "Ethomeen T/12." This material is a gel at room temperature, has an average molecular weight of 354 and a specific gravity at 25°/25° C. of 0.916. The alkyl substituents contain from about twelve to twenty carbon atoms per group and mostly sixteen to eighteen carbon atoms. Another mixed product is available commercially under the trade name of "Ethomeen S/12" and is N-soya-diethanolamine. It is a gel at room temperature, has an average molecular weight of 367 and a specific gravity at 25°/25° C. of 0.911. The alkyl substituents contain sixteen to eighteen carbon atoms per group. Still another commercial product is "Ethomeen C/12," which is N-coco-diethanolamine, and is a liquid at room temperature, and has an average molecular weight of 303 and a specific gravity at 25°/25° C. of 0.874. The alkyl groups contain mostly twelve carbon atoms per group, although it also contains groups having from eight to sixteen carbon atoms per group. Still another commercially available product is N-stearyl-diethanolamine, which is marketed under the trade name of "Ethomeen 18/12." This product is a solid at room temperature, has an average molecular weight of 372 and a specific gravity at 25°/25° C. of 0.959. It contains eighteen carbon atoms in the alkyl substituent.

When the alkanolamine contains one hydroxyl and two amino groups, a preferred alkanolamine is aminoalkyl alkanolamine. Here again, the alkanolamine contains from four and preferably from six to about fifty carbon atoms. Illustrative compounds include aminoethyl ethanolamine, aminoethyl propanolamine, aminoethyl butanolamine, aminoethyl pentanolamine, aminoethyl hexanolamine, etc., aminopropyl ethanolamine, aminopropyl propanolamine, aminopropyl butanolamine, aminopropyl pentanolamine, aminopropyl hexanolamine, etc., aminobutyl ethanolamine, aminobutyl propanolamine, aminobutyl butanolamine, aminobutyl pentanolamine, aminobutyl hexanolamine, etc., aminopentyl ethanolamine, aminopentyl propanolamine, aminopentyl butanolamine, aminopentyl pentanolamine, aminopentyl hexanolamine, etc., aminohexyl ethanolamine, aminohexyl propanolamine, aminohexyl butanolamine, aminohexyl pentanolamine, aminohexyl hexanolamine, etc. Here again, one or both of the nitrogen atoms of the aminoalkyl alkanolamine may contain hydrocarbon substituents and particularly alkyl group or groups of from one to twenty carbon atoms each or cycloalkyl groups and particularly cyclohexyl, or mixtures thereof.

The alkanolamine is reacted with the polycarboxylic acid, anhydride, diol or ester in any suitable manner. The reaction generally is effected at a temperature above about 175° F. and preferably at a higher temperature, which usually will not exceed about 500° F., although higher or lower temperatures may be employed under certain conditions. The exact temperature will depend upon whether a solvent is used and, when employed, on the particular solvent. For example, with benzene as the solvent, the temperature will be of the order of 175° F., with toluene the temperature will be of the order of 250° F., and with xylene the order of 300–320° F. Other preferred solvents include cumene, naphtha, Decalin, etc. Any suitable amount of the solvent may be employed but preferably should not comprise a large excess because this will tend to lower the reaction temperature and slow the reaction. Water formed during the reaction may be removed in any suitable manner including, for example, by operating under reduced pressure, by removing an azeotrope of water-solvent, by distilling the reaction product at an elevated temperature, etc. A higher temperature may be utilized in order to remove the water as it is formed. The time of reaction is sufficient to effect polymer formation and, in general, will range from about six to about forty hours or more. Preferably one or two mole proportions of the alkanolamine are reacted per one mole proportion of the acid, anhydride, diol or ester.

The polymer formed in the above manner will comprise polyesters and, when prepared from alkanolamines containing two or more amino groups, probably also will include polyamides in addition to the polyesters.

The phosphate, thiophosphate, phosphinate or phosphonate salt of the polymeric reaction product described above is prepared in any suitable manner. In general, the phosphate, thiophosphate, etc., is used in a proportion of from about 0.5 to about 2 acidic equivalents of phosphate or thiophosphate per one basic equivalent of polymeric reaction product. The reaction is conveniently prepared by intimately mixing the reactants at ambient temperature although, when desired, an elevated temperature may be employed. In general, the temperature will be within the range of from atmospheric to about 200° F. and, in some cases, up to 300° F., although temperatures outside of this range may be employed depending upon the specific reactants and solvent utilized. The mixing may be effected at atmospheric pressure or, when desired, under superatmospheric pressure which may be within the range of from about 5 to 100 pounds per square inch or more. The time of mixing and reacting will range from a fraction of an hour to twenty-four hours or more and generally from about one-quarter to about two hours. The reaction is an exothermic one and almost instantaneous, the time of mixing being determined more by the rate of addition of the ingredients and the geometry of the system than the rate of the reaction.

The reaction of the phosphate with the polymeric reaction product generally is exothermic and preferably is controlled by affecting the reaction in the presence of an inert solvent. Any suitable solvent may be employed, an aromatic hydrocarbon being particularly preferred. The aromatic hydrocarbons include benzene, toluene, xylene, ethylbenzene cumene, Decalin, tetralin, etc. Other solvents include saturated aliphatic esters as ethyl acetate, amyl acetate, 2-ethylhexyl acetate, methyl propionate, methyl butyrate, ethyl butyrate, isopropyl butyrate, etc., saturated aliphatic nitriles as acetonitrile, propionitrile, etc., dioxane, nitrobenzene, chlorobenzene, chloroform, carbon tetrachloride, etc. The reaction normally is effected in the absence of a catalyst.

The addition reaction product generally is recovered as a viscous liquid. It may be marketed and used as such or as a solution in a suitable solvent including, for example, saturated paraffinic hydrocarbons including pentane, hexane, heptane, octane, etc., aromatic hydrocarbons including benzene, toluene, xylene, cumene, etc., Decalin, tetralin, alcohols, ketones, etc. However, when the product is recovered in the absence of a solvent or when the product is not sufficiently soluble in the substrate, the desired solubility may be obtained by dissolving the product in a mutual solvent. Suitable solvents for this purpose comprise phenols and particularly alkylphenols or polyalkylphenols in which the alkyl group or groups contain from six to twenty carbon atoms. The phenol may be used in a concentration of from about 1% and preferably from about 25% to about 500% by weight and, more particularly, from about 30% to about 200% by weight of the addition reaction product.

The addition reaction product of the present invention will have varied utility and is useful as an additive to organic substrates which undergo oxidative, thermal or other deterioration. The additive functions as a lubricity or extreme pressure agent, also as flame-proofing agent. In addition, the additive serves as a detergent-dispersant, peroxide decomposer, corrosion inhibitor, rust inhibitor, etc. Organic substrates include gasoline, naphtha, kerosene, jet fuel, lubricating oil, diesel fuel, fuel oil, residual oil, drying oil, grease, wax, resin, plastic, rubber, etc.

The addition reaction product of the present invention is advantageously used as an additive in lubricating oil. The lubricating oil may be of natural or synthetic origin. The mineral oils include those of petroleum origin and are referred to as motor lubricating oil, railroad type lubricating oil, marine oil, transformer oil, turbine oil, differential oil, diesel lubricating oil, gear oil, cylinder oil, specialty products oil, etc. Other oils include those of animal, marine or vegetable origin.

The lubricating oils generally have a viscosity within the range of from 10 SUS at 100° F. to 1000 SUS at 210° F. (SAE viscosity numbers include the range from SAE 10 to SAE 160). The petroleum oils are obtained from paraffinic, naphthenic, asphaltic or mixed base crudes. When highly paraffinic lubricating oils are used, a solubilizing agent also is used.

Synthetic lubricating oils are of varied types including aliphatic esters, polyalkylene oxides, silicones, esters of phosphoric and silicic acids, highly fluorine-substituted hydrocarbons, etc. Of the aliphatic esters, di-(2-ethylhexyl) sebacate is being used on a comparatively large commercial scale. Other aliphatic esters include dialkyl azelates, dialkyl suberates, dialkyl pimelates, dialkyl adipates, dialkyl glutarates, etc. Specific examples of these esters include dihexyl azelate, di-(2-ethylhexyl) azelate, di-3,5,5-trimethylhexyl glutarate, di-3,5,5-trimethylpentyl glutarate, di-(2-ethylhexyl) pimelate, di-(2-ethylhexyl) adipate, triamyl tricarballylate, pentaerythritol tetracaproate, dipropylene glycol dipelargonate, 1,5-pentanediol-di-(2-ethylhexanonate), etc. The polyalkylene oxides include polyisopropylene oxide, polyisopropylene oxide diether, polyisopropylene oxide diester, etc. The silicones include methyl silicone, methylphenyl silicone, etc., and the silicates include, for example, tetraisooctyl silicate, etc. The highly fluorinated hydrocarbons include fluorinated oil, perfluorohydrocarbons, etc.

Additional synthetic lubricating oils include (1) neopentyl glycol esters in which the ester group contains from three to twelve carbon atoms or more, and particularly neopentyl glycol propionates, neopentyl glycol butyrates, neopentyl glycol caproates, neopentyl glycol caprylates, neopentyl glycol pelargonates, etc., (2) trimethylol alkane esters such as the esters of trimethylol ethane, trimethylol propane, trimethylol butane, trimethylol pentane, trimethylol hexane, trimethylol heptane, trimethylol octane, trimethylol decane, trimethylol undecane, trimethylol dodecane, etc., and particularly triesters in which the ester portions each contain from three to twelve carbon atoms and may be selected from those hereinbefore specifically set forth in connection with the discussion of the neopentyl glycol esters, (3) complex esters composed of dibasic acids and glycols, especially neopentyl, neohexyl, etc., glycols further reacted or capped with monobasic acids or alcohols to give lubricants of viscosities at 210° F. of from four to twelve centistokes or higher, and (4) tricresylphosphate, trioctylphosphate, trinonylphosphate, tridecylphosphate, as well as mixed aryl and alkyl phosphates, etc.

The present invention also is used in the stabilization of greases made by compositing one or more thickening agents with an oil of natural or synthetic origin. Metal base synthetic greases are further classified as lithium grease, sodium grease, calcium grease, barium grease, strontium grease, aluminum grease, etc. These greases are solid or semi-solid gels and, in general, are prepared by the addition to the lubricating oil of hydrocarbon soluble metal soaps or salts of higher fatty acids as, for example, lithium stearate, calcium stearate, aluminum naphthenate, etc. The grease may contain one or more thickening agents such as silica, carbon black, talc, organic modified Bentonite, etc., polyacrylates, amides, polyamides, aryl ureas, methyl N-n-octadecyl terephthalomate, etc. Another type of grease is prepared from oxidized petroleum wax, to which the saponifiable base is combined with the proper amount of the desired saponifying agent, and the result mixture is processed to produce a grease. Other types of greases in which the features of the present invention are usable include petroleum greases, whale grease, wool grease, etc., and those made from inedible fats, tallow, butcher's waste, etc.

Oils of lubricating viscosity also are used as transmission fluids, hydraulic fluids, industrial fluids, etc., and the novel features of the present invention are used to further improve the properties of these oils. During such use the lubricity properties of the oil are important. Any suitable lubricating oil which is used for this purpose is improved by incorporating the additive of the present invention.

Oils of lubricating viscosity also are used as cutting, oils, rolling oils, soluble oils, drawing compounds, etc. In this application, the oil is used as such or as an emulsion with water. Here again, it is desired that the oil serves to lubricate the metal parts of saws, knives, blades, rollers, etc., in addition to dissipating the heat created by the contact of the moving metal parts.

Oils of lubricating viscosity also are used as slushing oils. The slushing oils are employed to protect finished or unfinished metal articles during storage or transportation from one area to another. The metal articles may be of any shape or form including steel sheets, plates, panels, coils, bars, etc., which may comprise machine parts, engines, drums, piston rings, light arms, etc., as well as farm machinery, marine equipment, parts for military or other vehicles, household equipment, factory equipment, etc. A coating which may be visible to the eye, or not, as desired, covers the metal part and protects it from corrosion, etc.

In another embodiment the additional reaction products of the present invention possess insecticidal properties with good inner-therapeutic action. They may be employed against many types of mites and insects such as, for example, Corausius larvae, Cotoneaster aphid, apple aphid, black bean aphid, aster aphid, green peach aphid, crysanthemum aphid, pea aphid, etc. The reaction products or mixture of these may be used for the control of various larvae, mites, eggs of mites and such insects as flour beetle, Mexican bean beetle, black carpet beetle, milkweed bug, German cockroaches, southern army worms, mealy bug, sow bug, citrus red spider, greenhouse red spider, various mosquitoes, yellow fever mosquito, malarial mosquito, houseflies, etc.

As hereinbefore set forth, the polymeric reaction products of the present invention also possess flame-proofing or flame retardant properties and, therefore, are useful in plastics, coatings, paints, drying oils, etc., as well as in fibrous materials. For example, in textiles, the reaction product imparts flame retardant as well as insecticidal properties to the fabric.

The concentration of the addition reaction product to be employed as an additive will depend upon the particular substrate in which it is to be used. In general, the additive is used in a concentration of from about 0.001% to about 25% by weight of the substrate and more specifically within the range of from about 0.01% to about 5% by weight of the substrate. When used in conventional lubricating oil, the additive generally may be employed in a concentration of from about 0.01% to about 2% by weight of the oil. When used in lubricating oil for more severe operations, such as hypoid gear oil, the additive is used in a concentration of from about 1% to about 20% or more by weight of the oil. In general, substantially the same range of additive concentration is employed when the oil is used as transmission fluid, hydraulic fluid, industrial fluid, etc. When the oil is used in the formulation of a grease, the additive is used in a concentration of from about 0.5% to 5% by weight of the oil. When used in cutting oil, rolling oil, soluble oil, drawing compound, etc., the additive may be used in a concentration of from about 0.1% to about 10% by weight of the oil. When used in slushing oil, the additive may be used in a concentration of from about 0.1% to about 15% by weight or more of the oil.

It is understood that the additive of the present invention may be used along with other additives incorporated in the organic substrate. The other additives will depend upon the particular organic substrate. For example, in lubricating oil, the additional additives may comprise one or more of viscosity index improver, pour point depressor, anti-foam additive, detergent, corrosion inhibitor, additional antioxidant, etc. Preferred additional antioxidants are of the phenolic type and include tertiarybutylcatechol, 2,6 - ditertiarybutyl - 4 - methylphenol, 2,4 - dimethyl-6-tertiarybutylphenol, etc., 2-tertiarybutyl-4-methoxyphenol, 2-tertiary-4-ethoxyphenol, 3,3',5,5' - tetratertiarybutyldiphenylmethane, etc.

The addition reaction product of the present invention is an emulsifying agent and therefore will serve to emulsify water and oil of lubricating viscosity for use as lubircating oil, slushing oil, cutting oil, rolling oil, soluble oil, drawing compound, etc. When desired, an additional emulsifying agent may be employed. Any suitable emulsifying agent can be used, including alkali metal sulfonates of petroleum sulfonic acids, mahogany sulfonates, naphthenic acids, fatty acids, etc., fatty alcohol sulfonates, pentaerythritol oleates, laureates, etc. The amount of water used in the emulsified oils will depend upon the particular use of the emulsion and may range from 0.25% to 50% or even up to 98% by weight of the composition.

The additive of the present invention is incorporated in the substrate in any suitable manner and preferably the mixture is suitably agitated or otherwise mixed in order to obtain intimate admixing of the additive and of the substrate. When the substrate comprises a mixture of two or more components, the additive of the present invention may be commingled with one of the components prior to mixing with the remaining component or components of the substrate.

The following examples are introduced to illustrate further the novelty and utility of the present invention but not with the intention of unduly limiting the same.

*Example I*

The addition reaction product of this example was prepared by reacting di-(oxyethylenated nonylphenol)-phosphate, containing an average of five oxyethylene groups per each nonylphenyl group, with the polymeric reaction product of A anhydride (5,6,7,8,9,9-hexachloro-1,2,3,4, 4a, 5,8,8a - octahydro - 5,8 - methano - 2,3-naphthalenedicarboxylic anhydride) with N - tallow - diethanolamine (Ethomeen T/12). The polymeric reaction product was prepared by refluxing 106.25 g. (0.25 mole) of the A anhydride and 92 g. (0.25 mole) of the N-tallow-diethanolamine in the presence of 200 g. of xylene. Refluxing was continued for about seven hours at a maximum temperature of about 300° F., during which time a total of 4.5 cc. of water was collected. Following completion of the reaction, the xylene solvent was removed by distilling under water pump vacuum at a maximum temperature of about 330° F. The polymeric reaction product has a basic nitrogen equivalent of 1.31 meq./g. and a basic mole combining weight of 764, with the latter corresponding to the theoretical mole combining weight of 775.

The addition reaction product was prepared by mixing at room temperature, 38.2 g. (0.05 basic equivalent) of the polymeric reaction product described above and 55.8 g. (0.05 acidic equivalent) of the di-(oxyethylenated nonylphenol)-phosphate, containing an average of five oxyethylene groups, after which the mixture was heated on a steam bath (temperature of about 200° F.) with continued stirring. The addition reaction product was recovered as a heavy amber oil containing 10.9% by weight of chlorine.

*Example II*

The addition reaction product of this example was prepared by reacting di-(oxyethylenated nonylphenol)-dithiophosphate, containing an average of eight oxyethylene groups per each nonylphenyl group, with the polymeric reaction product described in Example I. The addition reaction product was prepared by mixing, at room temperature, 38.2 g. (0.05 basic equivalent) of the polymeric reaction product described in Example I with 72.5 g. (0.05 acidic equivalent) of the di-(oxyethylenated nonylphenol)-dithiophosphate, containing an average of eight oxyethylene groups, following which the mixture was heated on a steam bath with continued stirring. The addition reaction product was recovered as a heavy amber oil containing 9.4% by weight of chlorine.

*Example III*

The addition reaction product of this example was prepared by reacting mixed mono- and ditridecyl acid orthophosphates with a polymeric reaction product prepared by reacting A anhydride with N,N'-dioctyl-N-hydroxyethyl-aminoethyl-ethanolamine. The alkanolamine was prepared by the oxyethylenation of N,N'-dioctyl-ethylenediamine. The polymeric reaction product was prepared by refluxing 47.4 g. (0.125 basic equivalent) of the aminoethyl ethanolamine and 53 g. (0.125 acidic equivalent) of the A anhydride in the presence of 200 g. of xylene. The refluxing was continued for about nine hours and a total of 2 cc. of water was collected. The xylene solvent was removed by distilling under water pump vacuum at a temperature of about 400° F. The polymeric reaction product had a basic nitrogen equivalent of 2.33 meq./g. and a basic mole combining weight of 429.

The addition reaction product was prepared by mixing, at room temperature, 42.9 g. (0.05 acidic equivalent) of the mixed mono- and ditridecyl acid orthophosphate, followed by heating on a steam bath with continued stirring. The addition reaction product was recovered as a heavy amber oil containing 11.2% by weight of chlorine.

*Example IV*

The addition reaction product of this example is prepared by reacting di-(oxypropylenated octylphenol)-phosphate, containing an average of three oxypropylene groups per each octylphenyl group, with the polymeric reaction product of "Chlorendic" anhydride with N-tallow-diethanolamine (Ethomeen T/12). The polymeric reaction product is prepared by refluxing 185.4 g. (0.5 mole) of "Chlorendic" anhydride and 184 g. (0.5 mole) of N-tallow-diethanolamine. The refluxing was continued for six hours at a temperature of about 310° F. and a total of 9 cc. of water was collected. The xylene solvent was removed by heating the product at 275° F. under water pump vacuum. The polymeric reaction product has a basic nitrogen equivalent of 1.10 meq./g.

The addition reaction product is prepared by commingling, at room temperature, equal equivalents of the di-(oxypropylenated octylphenol)-phosphate, containing an average of three oxypropylene groups, with the polymeric reaction product described above. The mixture then is heated on a steam bath with continued stirring and the addition reaction product is recovered as a heavy amber oil.

*Example V*

The addition reaction product of this example is prepared by reacting mixed mono- and dioctyl-dithiophosphates with the polymeric reaction product prepared by reacting the diol corresponding to "Chlorendic" acid, N-tallow-diethanolamine (Ethomeen T/12) and dodecenyl succinic anhydride. The diol is prepared by reacting hexachlorocyclopentadiene with 1,4-butenediol. The polymeric reaction product is prepared by refluxing 45.13 g. (0.125 mole) of the "Chlorendic" diol, 48 g. (0.125 mole) of N-tallow-diethanolamine and 70.5 g. (0.25 mole) of dodecenyl succinic anhydride. The refluxing is effected at a temperature of about 340° F. for about eight hours and a total of 4.5 cc. of water is collected. The xylene solvent is removed by distilling at a temperature up to about 350° F. under water pump vacuum. The product is recovered as a very heavy amber oil.

The addition reaction product is prepared by mixing on a steam bath equal equivalents of the mixed mono- and dioctyl-dithiophosphates and of the polymeric reaction product prepared in the above manner. The addition reaction product is recovered as a heavy amber oil.

*Example VI*

The addition reaction product of this example is prepared by reacting di-(oxypropylenated dodecanol)-phosphate, containing an average of five oxypropylene groups per each dodecyl group, with an ester of B acid (5,6,7,8,-9,9-hexachloro - 1,2,3,4,4a,5,8,8a - octahydro-1,4,5,8-dimethano-2,3-naphthalenedicarboxylic acid) and octanol, with N-decylaminopropyl-propanolamine. The ester of B acid and octanol is prepared by refluxing equal mole proportions of the acid and alcohol under conditions to liberate water, the water being removed simultaneously during the reaction. The resulting ester and N-decyl-aminopropyl-propanolamine are refluxed in the presence of xylene solvent to liberate water and to form the polymeric reaction product.

The above polymeric reaction product is commingled in equal mole proportions with the di-(oxypropylenated dodecanol)phosphate and heated on a steam bath with intimate stirring. The addition reaction product is recovered as a heavy amber oil.

*Example VII*

The addition reaction product of this example is the O-capryl-O-hexyl-dithiophosphate reaction product with a polymeric reaction product of A acid and N-soya-diethanolamine (Ethomeen S/12). The polymer reaction product is prepared by refluxing equal mole proportions of the A acid and N-soya-diethanolamine and removing the water formed during the reaction. One basic equivalent of the polymeric reaction product is mixed with one acidic equivalent of the O-capryl-O-hexyl-dithiophosphate and then heated on a steam bath with intimate stirring. The addition reaction product is recovered as a heavy amber oil.

*Example VIII*

The addition reaction product of this example is prepared by mixing 15.8 g. (0.1 mole) of benzene phosphonic acid with 0.2 basic equivalents of the polymeric reaction product of A anhydride (5,6,7,8,9,9-hexachloro-1,2,3,4,4a,5,8,8a-octahydro - 5,8 - methano - 2,3 - naphthalenedicarboxylic acid anhydride) with N-tallow-diethanolamine (Ethomeen T/12), equivalent to 152.8 g., and fully described in Example I. An exothermic reaction results. The product is heated to 210° F. to complete the reaction. A 50% by weight solution in xylene is made, and the product used as anti-fouling and flame-proofing additive in fire retardant paint.

*Example IX*

In this example, 0.1 basic equivalents of the polymeric reaction product of A anhydride and N-tallow-diethanolamine (Ethomeen T/12) is mixed with 14.2 g. of benzene phosphinic acid. An exothermic reaction results. The product is heated to 210° F. to complete the reaction. The product is used in automatic transmission oil as a lubricity additive.

*Example X*

As hereinbefore set forth, the addition reaction products of the present invention are of especial utility as additives in lubricating oil. One method of evaluating lubricating oils is by the Falex machine. This procedure is described in detail in a book entitled "Lubricant Testing" authored by E. G. Ellis and published by Scientific Publications (Great Britain) Limited, 1953, pages 150–154. Briefly, the Falex machine consists of a rotating pin which runs between two V shape bearings which are spring loaded against the pin and provided with means for varying the load. The oil to be tested is poured into a metal trough in which the pin and bearings are partly submerged. The machine was operated for five minutes each at 250 and 500 pound loads and then forty-five minutes at 750 pound load. The data collected includes the temperature of the oil at each of the loads, as well as the wear which is determined by a ratchet wheel arrangement in which the teeth are advanced in order to maintain the desired load. Each tooth is equivalent to approximately 0.000022 inch. Preferred additives are those which impart low temperature, low torque and low wear to the oil.

In another series of tests the machine was operated for five minutes at each load from 250 pounds to seizure at 250 pound increments. The maximum load and the time in minutes at this load to seizure are reported, as well as the temperature of the oil. In this case the higher temperature is preferred because it means that the oil is operating satisfactorily at a higher temperature.

The lubricating oil used in this example is dioctyl sebacate synthetic lubricating oil marketed under the trade name of "Plexol 201."

Run No. 1 in the following table is a run made using the "Plexol" not containing an additive and thus is the blank or control run.

Run. No. 2 is a run made using another sample of "Plexol" to which had been added two percent by weight of the addition reaction product prepared as described in Example I.

Run No. 3 is made using another sample of the "Plexol" to which had been added two percent by weight of the addition reaction product prepared as described in Example II.

TABLE I

| Run No. | Temperature, °F. | | | Torque, lbs. | | | Wear, Teeth | | | Seizure Conditions | | |
|---|---|---|---|---|---|---|---|---|---|---|---|---|
| | 250 | 500 | 750 | 250 | 500 | 750 | 250 | 500 | 750 | Load | Time | Temperature, °F. |
| 1 | 150 | 231 | 490–S | 3–4 | 9–10 | 18–S | 0 | 0 | S | 750 | 2 | 490 |
| 2 | 126 | 215 | 330 | 3–5 | 10–12 | 16–18 | 0 | 0 | 12 | 1,500 | 0.1 | 475 |
| 3 | 152 | 267 | 335 | 4–6 | 13–15 | 16–20 | 0 | 0 | 31 | 1,500 | 2.7 | 500 |

S—Seizure.

From the data in the above table, it will be seen that the dioctyl sebacate without additive (Run No. 1) underwent seizure at a load of 750 pounds. In contrast, seizure conditions for the samples of the dioctyl sebacate containing the additives of the present invention was 1500 pounds. Also of importance is the fact that the oil, after evaluation in Run No. 2, was clear.

*Example XI*

Another series of evaluations were made in the same manner as described in Example X except that the lubricating oil was a mineral oil marketed commercially as "Carnes 340 White Oil." Typical specifications of this oil include the following:

| | |
|---|---|
| Distillation range, °F. | 740–975 |
| Specific gravity at 60° F. | 0.8836 |
| Viscosity: | |
| At 100° F. | 360 |
| At 210° F. | 52.2 |
| Flash point, COC, °F. | 440 |
| Pour point, °F. | −20 |
| Refractive index at 68° F. | 1.4805 |
| Saybolt color | +30 |

Run No. 4 in the following table is a run using the white oil not containing an additive and thus is the blank or control run.

Run No. 5 is a run using another sample of the white oil to which had been added two percent by weight of the addition reaction product of Example I.

Run No. 6 is a run using another sample of the white oil to which had been added two percent by weight of the addition reaction product of Example II.

Here again, it will be seen that the oil without additive (Run No. 4) underwent seizure at a small load which, in this case, was 425 pounds. In contrast, the white oil containing the additives of the present invention did not undergo seizure until a load of 1250 pounds. Also, the oil after evaluation in Run No. 5 was clear and, as hereinbefore set forth, this is an important advantage.

storage, transportation and use containing, as an additive against said deterioration, a small but improving concentration of the addition reaction product, formed at a temperature of from atmospheric to 300° F., of from about 0.5 to about 2 acidic equivalents of a phosphorus compound selected from the group consisting of phosphate, thiophosphate, phosphinate and phosphonate with one basic equivalent of the polymeric reaction product, formed at a temperature of from about 175° to about 500° F., of one mole proportion of a compound selected from the group consisting of polyhalopolyhydropolycyclicdicarboxylic acid, corresponding anhydride, corresponding diol and ester of said acid with from one to two mole proportions of an alkanolamine selected from the group consisting of alkanolamine containing at least two hydroxyl and one amino groups and alkanolamine containing at least one hydroxyl and two amino groups, said alkanolamine containing from 4 to about 50 carbon atoms, and said polyhalopolyhydropolycyclicdicarboxylic acid having the formula:

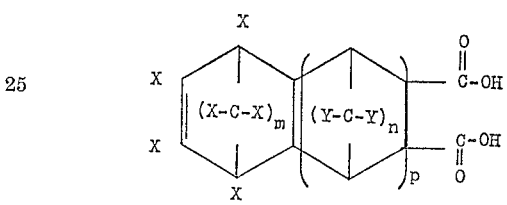

TABLE II

| Run No. | Temperature, °F. | | | Torque, lbs. | | | Wear, Teeth | | | Seizure Conditions | | |
|---|---|---|---|---|---|---|---|---|---|---|---|---|
| | 250 | 500 | 750 | 250 | 500 | 750 | 250 | 500 | 750 | Load | Time | Temperature, °F. |
| 4 | 172 | 350–S | | 5–6 | 30–S | | 0 | S | | 425 | <0.1 | 275 |
| 5 | 173 | 263 | 355 | 5–6 | 12–13 | 18–19 | 0 | 0 | 7 | 1250 | 2.7 | 513 |
| 6 | 175 | 267 | 335 | 5–6 | 12–13 | 18–25 | 0 | 0 | 11 | 1250 | 1.5 | 650 |

S—Seizure.

Example XII

The addition reaction product, prepared as described in Example IX, is used in a concentration of 1% by weight as an additive in grease. The additive is incorporated in a commercial Mid-Continent lubricating oil having an S.A.E. viscosity of 20. Approximately 92% of the lubricating oil then is mixed with approximately 8% by weight of lithium stearate. The mixture is heated to about 450° F., with constant agitation. Subsequently, the grease is cooled, while agitating, to approximately 248° F., and then the grease is further cooled slowly to room temperature.

The stability of the grease is tested in accordance with ASTM D–942 method, in which method a sample of the grease is placed in a bomb and maintained at a temperature of 212° F. Oxygen is charged to the bomb, and the time required for a drop of five pounds pressure is taken as the Induction Period. A sample of the grease without additive will reach the Induction Period in about eight hours. On the other hand, a sample of the grease containing 1% by weight of the additive of the present invention will not reach the Induction Period for more than 100 hours.

Example XIII

An insecticidal composition is prepared by dissolving 1 g. of the reaction product of Example I in 2 cc. of benzene and emulsifying the resultant solution with 100 cc. of water using Triton X–100 as the emulsifying agent. The resulting emulsion is sprayed into a cage containing houseflies and results in substantial knockdown.

I claim as my invention:

1. Organic substance subject to deterioration during in which X is chlorine, bromine, hydrogen or alkyl of from 1 to 10 carbon atoms, at least two of the X's being chlorine or bromine, Y is chlorine, bromine, hydrogen or alkyl of 1 to 10 carbon atoms, m is an integer from 1 to 4, n ranges from 0 to 4 and p ranges from 0 to 4.

2. The composition of claim 1 wherein said polyhalopolyhydropolycyclicdicarboxylic acid is 5,6,7,8,9,9-hexachloro - 1,2,3,4,4a,5,8,8a - octahydro - 5,8 - methano - 2,3 naphthalenedicarboxylic acid.

3. The composition of claim 1 wherein said polyhalopolyhydropolycyclicdicarboxylic anhydride is 5,6,7,8,9,9-hexachloro - 1,2,3,4,4a,5,8,8a-octahydro-5,8-methano-2,3-naphthalenedicarboxylic anhydride.

4. The composition of claim 1 wherein said polyhalopolyhydropolycyclicdicarboxylic acid is 5,6,7,8,9,9-hexachloro - 1,2,3,4,4a,5,8,8a-octahydro - 1,4,5,8-dimethano-2,3-naphthalenedicarboxylic acid.

5. The composition of claim 1 wherein said polyhalopolyhydropolycyclicdicarboxylic anhydride is 5,6,7,8,9,9-hexachloro-1,2,3,4,4a,5,8,8a-octahydro-1,4,5,8-dimethano-2,3-naphthalenedicarboxylic anhydride.

6. The composition of claim 1 wherein said polyhalopolyhydropolycyclicdicarboxylic acid is 1,4,5,6,7,7-hexachlorodicyclo-(2.2.1)-5-heptene-2,3-dicarboxylic acid.

7. The composition of claim 1 wherein said alkanolamine is N-alkyl-diethanolamine, said alkyl containing from 1 to about 50 carbon atoms.

8. The composition of claim 1 wherein said alkanolamine is an aminoethyl ethanolamine.

9. The composition of claim 1 wherein said phosphate is a mixture of mono and dialkyl acid orthophosphates, the alkyl containing from 1 to about 20 carbon atoms.

10. The composition of claim 1 wherein said phosphate is a mixture of mono and dialkyl dithiophosphates, the alkyl containing from 1 to about 20 carbon atoms.

11. The composition of claim 1 wherein said phosphate is di-(oxyethylenated alkylphenol)-phosphate, the alkyl containing from 1 to about 20 carbon atoms.

12. The composition of claim 1 wherein said phosphate is di-(oxyethylenated alkylphenol)-dithiophosphate, the alkyl containing from 1 to about 20 carbon atoms.

13. The composition of claim 1 wherein said phosphate is di-(oxyethylenated alkanol)-phosphate, the alkanol moiety containing from 4 to about 20 carbon atoms.

14. The composition of claim 1 wherein said phosphate is di-(oxyethylenated alkanol)-dithiophosphate, the alkanol moiety containing from 4 to about 20 carbon atoms.

15. The composition of claim 1 wherein said phosphonate is benzene phosphonic acid.

16. The composition of claim 1 wherein said phosphinate is benzene phosphinic acid.

17. The composition of claim 1 wherein said organic substance is a lubricant comprising a major proportion of an oil of lubricating viscosity and said addition reaction product is in a concentration of from about 0.001% to about 25% by weight.

18. The composition of claim 2 wherein said organic substance is lubricating oil.

19. The composition of claim 3 wherein said organic substance is lubricating oil.

20. The composition of claim 6 wherein said organic substance is lubricating oil.

21. The composition of claim 3 wherein said lubricant is grease.

References Cited

UNITED STATES PATENTS 3,316,175   4/1967   Latos et al. _____ 44—63 XR

DANIEL E. WYMAN, *Primary Examiner.*

W. J. SHINE, *Assistant Examiner.*